Aug. 7, 1951 — L. M. CLAFFEY — 2,563,158
DETACHABLE DRIVE MECHANISM FOR VEHICLES
EQUIPPED WITH PRODUCT UNLOADING MEANS
Filed Dec. 11, 1948 — 2 Sheets-Sheet 1

Inventor
Luther M. Claffey
By W. S. McDowell
Attorney

Aug. 7, 1951     L. M. CLAFFEY     2,563,158
DETACHABLE DRIVE MECHANISM FOR VEHICLES
EQUIPPED WITH PRODUCT UNLOADING MEANS
Filed Dec. 11, 1948     2 Sheets-Sheet 2
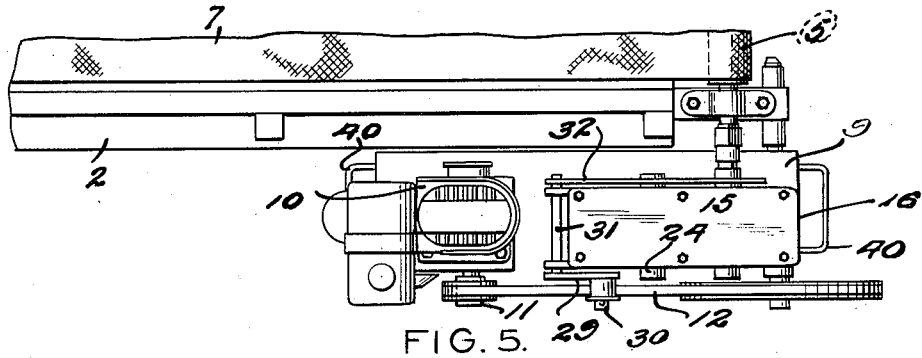
FIG. 5.
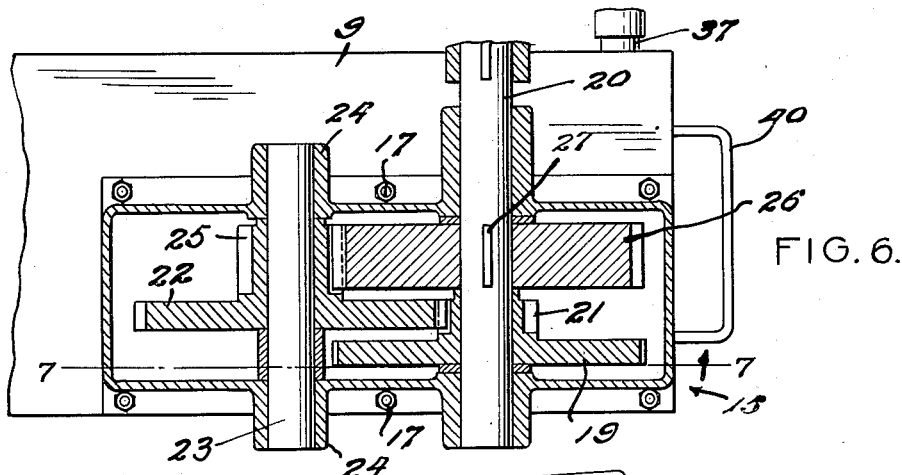
FIG. 6.
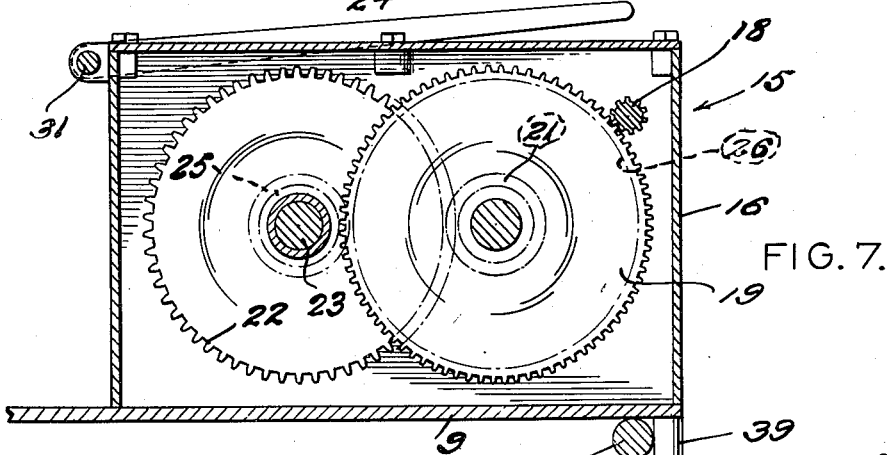
FIG. 7.
FIG. 8.
Inventor
Luther M. Claffey
By W. S. McDowell
Attorney Patented Aug. 7, 1951

2,563,158

UNITED STATES PATENT OFFICE 2,563,158

DETACHABLE DRIVE MECHANISM FOR VEHICLES EQUIPPED WITH PRODUCT UNLOADING MEANS

Luther M. Claffey, Groveport, Ohio

Application December 11, 1948, Serial No. 64,892

3 Claims. (Cl. 214—83.34)

1

This invention relates to apparatus for the type employed in connection with wheeled farm vehicles for the unloading of various farm products, such as cut hay, corn, grain and various field crops.

Such unloading apparatus comprises normally a flexible apron which is positioned for movement on the upper surface of the bed of a vehicle, particularly a vehicle designed for the reception of farm crops or products; the apron being connected at one end with a shaft or roll which is adapted to be suitably rotated for the purpose of imparting longitudinal movement to the belt or apron so that products positioned thereon may be moved longitudinally of the vehicle body or bed for discharge from one end of the vehicle.

The present invention is concerned more particularly with the provision of engine or motor driven means for imparting power to the shaft or drum with which the unloading belt or apron is connected, whereby to actuate said belt or apron in effecting unloading operations. Power devices heretofore developed for operating such unloaders have been characterized by their mechanical complexity and customarily have been formed to embody units independently mounted and supported with respect to the body of the vehicle containing the unloading mechanism, necessitating in certain instances the positioning of the unloading vehicle contiguous to the support of the power-driving mechanism to admit of a coupling therebetween.

It is a primary object of the present invention to provide a power-furnishing unit for vehicle unloaders which, when in use, is adapted to be mounted on the vehicle and directly coupled with the unloading mechanism of said vehicle and which, when not needed, may be completely removed from the vehicle for storage or transportation purposes.

It is another object of the invention to provide a power drive for vehicle unloaders which is light in weight, capable of being lifted and readily handled by one operator, easily attached in drive-coupled relationship with the associated unloader, and an economical driving unit which will operate at speeds and under conditions best adapted for the handling of vehicle-carried loads.

With these and other objects in view, as will appear as the description proceeds, my invention consists in the novel features of construction, combinations of elements and arrangements of parts hereinafter more fully described and particularly pointed out in the appended claims.

In the accompanying drawings:

Fig. 5 is a fragmentary top plan view of the apparatus;

Fig. 6 is a sectional view through the speed-reducing gear mechanism of the apparatus;

Fig. 7 is a vertical sectional view taken on the plane indicated by the line 7—7 of Fig. 6;

Fig. 8 is a detail sectional view disclosing one of the supporting studs of the power-furnishing unit and one of the vehicle-carried sockets for the reception of the stud.

Figure 1:
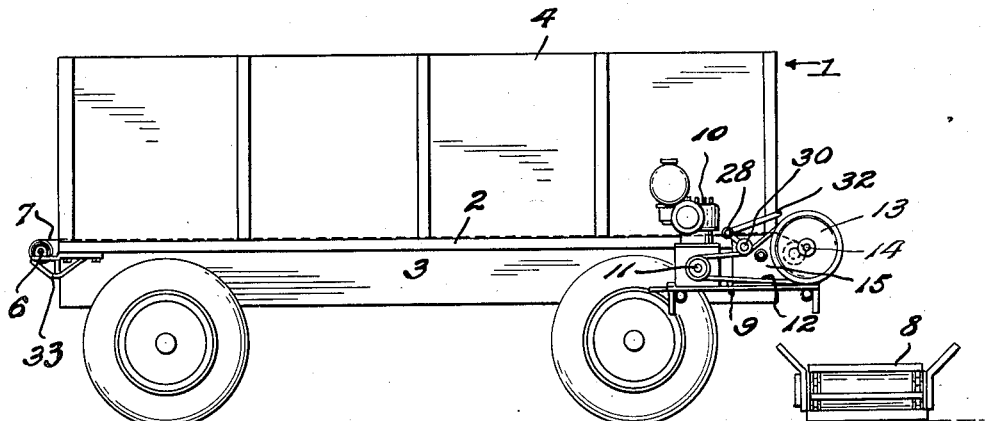
Fig. 1 is a side elevational view of a wheeled vehicle provided with a product unloading belt or conveyor and disclosing in its applied operative position thereon the power-furnishing drive mechanism forming the present invention.

Referring more particularly to the drawings, the numeral 1 designates in its entirety a wheeled vehicle of the type employed in transporting various farm products, such as ensilage, grain, hay or the like. The vehicle includes a body presenting a flat horizontal bed 2 and having longitudinally extending sill members 3. Arising from the marginal portions of the bed 2 are side and end walls 4, completing the vehicle body.

In association with such a body, there is employed an unloading mechanism. In the form of the invention illustrated, this unloading mechanism comprises a head shaft 5 and, if desired, a foot shaft 6. Secured to these shafts are the opposite end portions of a flexible apron 7. Normally, the apron is wound on the foot shaft and extends flatly across and lengthwise of the upper surface of the bed 2, being joined at its forward end with the head shaft 5. Products placed within the body of the vehicle are deposited on the apron 7, and it will be seen that when the head shaft is rotated, the apron is moved longitudinally of the vehicle body to convey products deposited thereon longitudinally of the vehicle and effecting their discharge over the head shaft 5. Such discharged products may be deposited on the ground or on a conveyor-type elevator, as indicated at 8, when the products are to be lifted as when being conveyed to a barn or granary.

As previously stated, it is the purpose of the present invention to provide an improved means for applying motive power to the apron to effect its actuation. Accordingly, the present invention embodies a base plate 9 on which is mounted a small internal combustion engine 10, although when electrical current is readily available, an electrical motor may be substituted for the explosive engine. In this instance, the crank shaft of the engine is provided with a belt pulley 11 around which passes an endless belt 12, the latter also being trained over a belt wheel 13 mounted on the driving shaft 14 of a speed-reducing transmission 15. This transmission includes an outer housing 16 which is bolted or otherwise secured as at 17 to the base plate 9. Within the housing, the shaft 14 is equipped with a straight toothed pinion 18, which meshes with an enlarged idler gear 19 loosely mounted on the driven shaft 20 of the transmission. The gear 19 has formed on its hub pinion teeth 21 which mesh with the teeth of an idler gear 22 loosely rotatable on an idler shaft 23, the latter having its ends supported in bearing extensions 24, forming a part of the housing 16. Formed with the hub region of the idler 22 is a pinion 25, the teeth of which mesh with those of a gear 26, the latter being keyed as at 27 to the driven shaft 20 of the transmission.

Pivotally mounted as at 28 on the exterior of the transmission housing is a crank 29. This crank carries at its outer end a roller 30 disposed for engagement with the upper run of the belt 12. The crank 29 is carried by a horizontally journaled shaft 31 with one end of which is connected an actuating lever 32. When this lever is rocked, corresponding movement is imparted to the crank 29 for the purpose of controlling the degree of slack in the drive belt and thereby govern the transmission of power from the engine to the speed-reducing gearing.

Attached to the under sides of the sill members 3 at the opposite ends of the latter are metallic straps of the type shown at 33. These straps carry bearing brackets 34, in which the head and foot shafts 5 and 6 are rotatably mounted. The strap shown at 33', which is arranged at the end of the vehicle body adjacent the power unit, is formed at its ends with depending webs 35 which terminate in sockets 36 adapted for the removable reception of spaced horizontally extending studs 37 which are carried by and project laterally from the base plate 9 of the power unit.

If desired, the walls of the sockets 36 may receive set screws 38, or their equivalents, to retain the studs against accidental displacement in said sockets. Depending from the bottom of the plate 9 are vertical supporting posts 39 on which the power unit may rest when detached from the vehicle body. The ends of the plate 9 may also be formed with hand-gripping bails 40, by means of which the entire power unit may be gripped by the two ends of a single operator and raised or lowered to insert or remove the studs 37 into and from their receiving sockets 36.

The head shaft 5 at one end may be provided with a squared socket member 41 in which is slidably and removably received the correspondingly squared end 42 of the driven shaft 20 of the speed-reducing mechanism.

Figure 2:
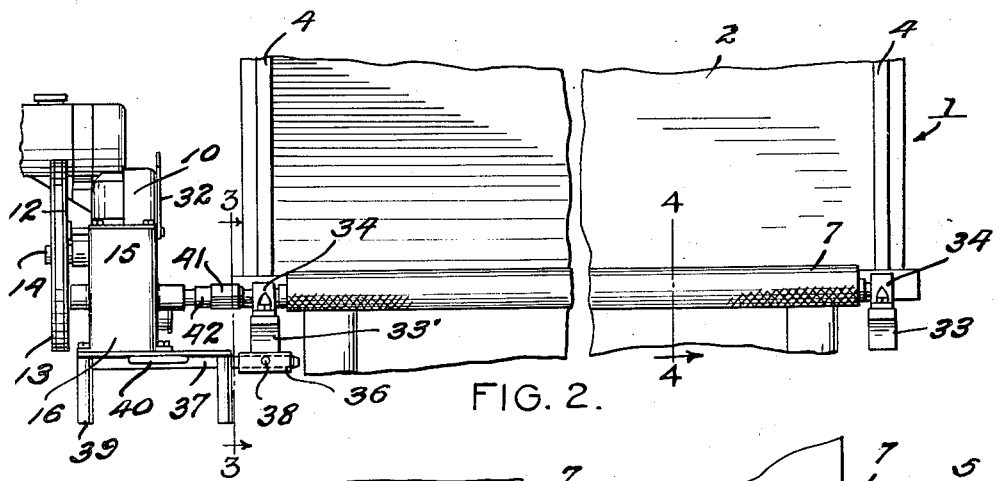
Fig. 2 is an end elevational view of the vehicle and the power-furnishing attachment.
Figures 3, 4:
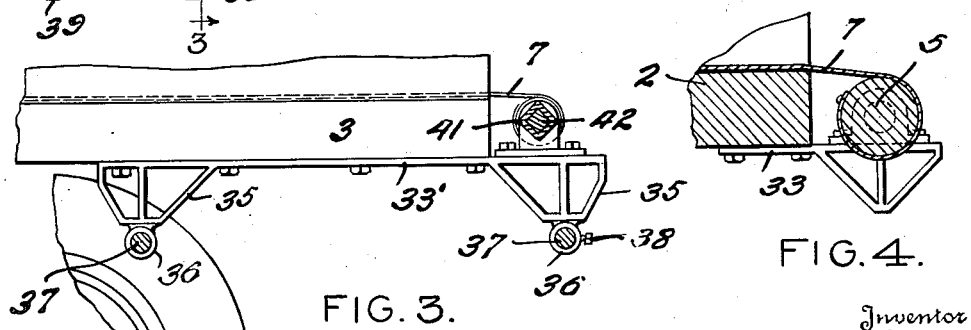
Fig. 3 is a detail vertical longitudinal sectional view taken through the apparatus on the plane indicated by the line 3—3 of Fig. 2.
Fig. 4 is a similar view on the line 4—4 of Fig. 2.

In view of the foregoing, it will be seen that the present invention provides a compact relatively lightweight power unit which may be raised or lowered by the efforts of one man. The unit may be readily applied when needed to a vehicle body to assume operating positions illustrated particularly in Figs. 1 and 2 of the drawings. In such a position, the engine of the unit may be used effectively to apply power to the head shaft of the unloading mechanism, moving the traveling apron of said mechanism to unload products from the body of the associated vehicle. When the power unit is not in use, it may be readily removed from the vehicle and stored for future use. The weight and size of the power attachment is such that it may be readily carried by the vehicle and thus adapted for use in fields and out-of-the-way locations on a farm. In this respect, my invention particularly is an improvement on prior power mechanisms requiring the unloading vehicle to be placed adjacent a stationary power unit. If my improvement is used in locations where electrical current is conveniently available, an electrical motor is employed in lieu of the gasoline engine.

I claim:

1. A portable lightweight power-furnishing attachment for vehicle-mounted product-unloading mechanisms, comprising a base plate, handles at the ends of said base plate for enabling the same to be manually gripped and bodily lifted, a prime mover mounted on said base plate, a speed-reducing mechanism supported on said base plate, said speed-reducing mechanism including a rotatable driven element, power-transmitting means operated by said prime mover for driving said speed-reducing mechanism, a detachable drive coupling uniting the driven element of said speed-reducing mechanism with a complemental rotating part of an associated unloading mechanism, studs projecting at longitudinally spaced intervals from one side of said base plate, and socket means carried by the vehicle on which said unloading mechanism is mounted for the detachable reception of said studs, said socket means and studs receiving the weight of the attachment in a manner relieving said coupling thereof.

2. A portable lightweight power-furnishing attachment for vehicle-mounted product-unloading mechanisms, comprising a base plate, handles at the ends of said base plate for enabling the same to be manually gripped and bodily lifted, a prime mover mounted on said base plate, a speed-reducing mechanism supported on said base plate, said speed-reducing mechanism including a rotatable driven element, power-transmitting means operated by said prime mover for driving said speed-reducing mechanism, a detachable drive coupling uniting the driven element of said speed-reducing mechanism with a complemental rotating part of an associated unloading mechanism, studs projecting at longitudinally spaced intervals from one side of said base plate, socket means carried by the vehicle on which said unloading mechanism is mounted for the detachable reception of said studs, and vertical leg posts depending from said bed plate for effecting the support of said attachment when the same is removed from its mounted position on an associated vehicle.

3. A portable power-furnishing attachment for a vehicle-mounted product-unloading mechanism, the latter having a power-receiving rotatable element, comprising: a prime mover, speed-reducing mechanism including a rotatable driven element, power-transmitting means operated by said prime mover driving said speed-reducing mechanism, a detachable drive coupling uniting the driven element of said speed-reducing mechanism with the rotating element of said unloading mechanism, rigid stud devices projecting at longitudinally spaced intervals from one side of said attachment, and fixed socket means carried by the associated vehicle on which said unloading mechanism is mounted and in which socket means said stud devices are slidably received, said stud devices and socket means therefor securing said attachment in detachable driving relation with respect to said unloading mechanism and supporting said attachment on the associated vehicle independently of said coupling, whereby to relieve the coupling of the weight of the attachment.

LUTHER M. CLAFFEY.

REFERENCES CITED

The following references are of record in the file of this patent:

UNITED STATES PATENTS

| Number | Name | Date |
| --- | --- | --- |
| 2,282,699 | Black | May 12, 1942 |
| 2,355,226 | Mallory | Aug. 8, 1944 |
| 2,389,779 | Heller | Nov. 27, 1945 |
| 2,448,122 | Recker | Aug. 31, 1948 |
| 2,488,217 | McCall | Nov. 15, 1949 |